C. K. PRINCE.
MOLD ASSEMBLING CRANE.
APPLICATION FILED JULY 18, 1919.
1,343,335.
Patented June 15, 1920.
2 SHEETS—SHEET 2.
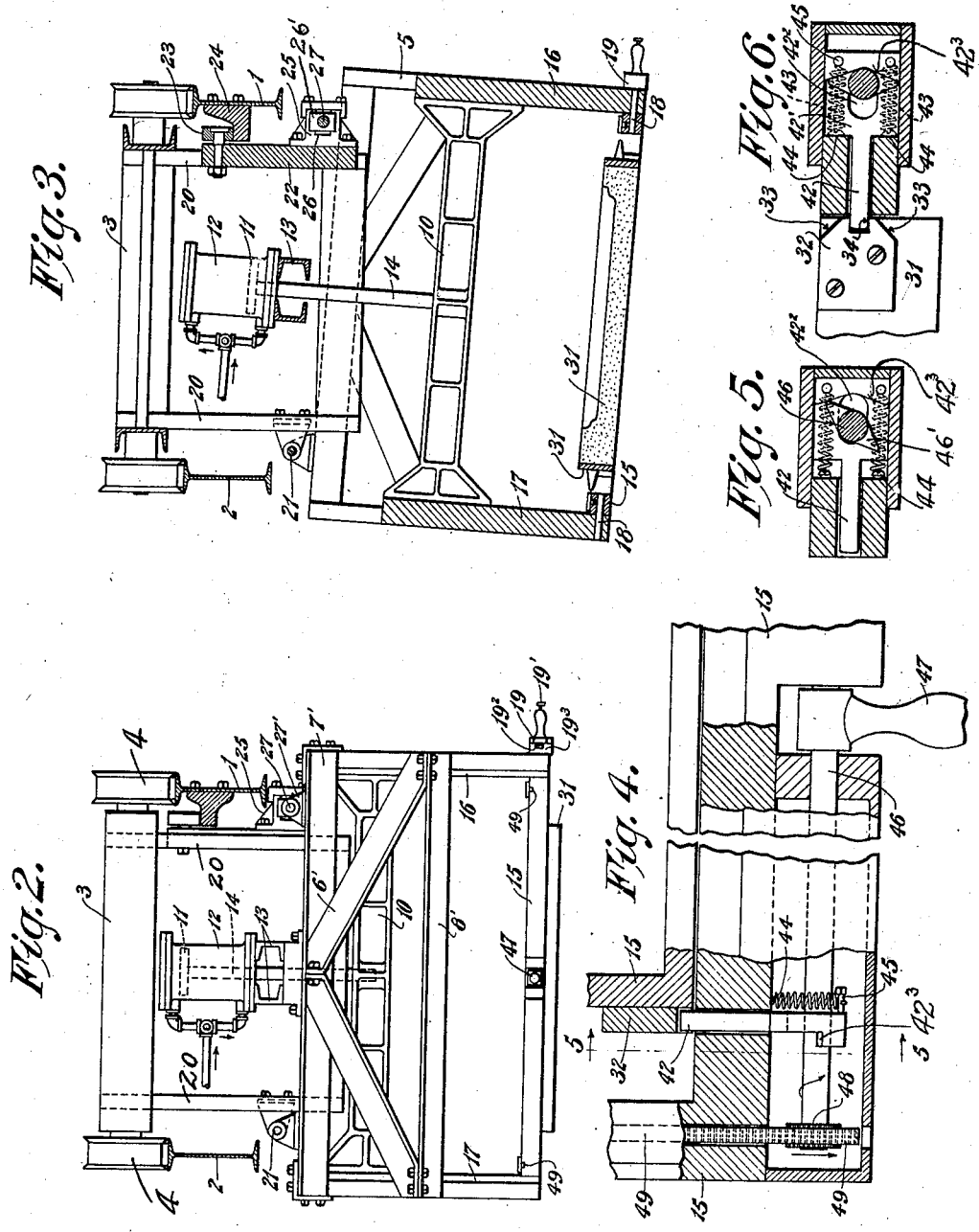
INVENTOR,
Clarence K. Prince,
BY
Harry W Bowen.
ATTORNEY.

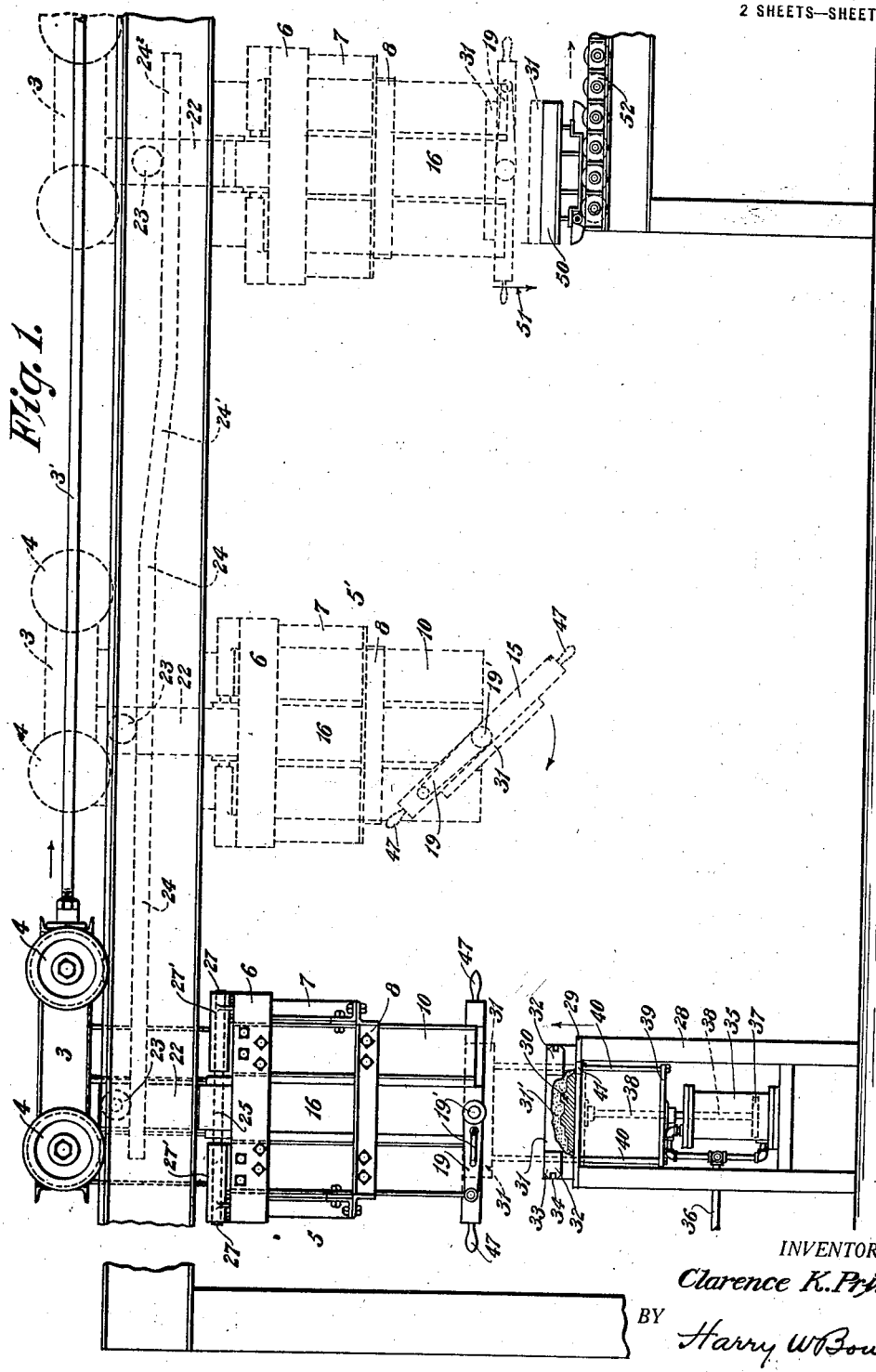

UNITED STATES PATENT OFFICE.

CLARENCE K. PRINCE, OF WESTFIELD, MASSACHUSETTS.

MOLD-ASSEMBLING CRANE.

1,343,335.  Specification of Letters Patent.  Patented June 15, 1920.

Application filed July 18, 1919. Serial No. 311,783.

*To all whom it may concern:*

Be it known that I, CLARENCE K. PRINCE, citizen of the United States of America, residing at Westfield, in the county of Hampden and Commonwealth of Massachusetts, have invented certain new and useful Improvements in Mold-Assembling Cranes, of which the following is a specification.

This invention relates to improvements in mold assembling cranes and more particularly to an apparatus for lifting and conveying the separate parts of a molding flask, one at a time, from the point where the molds are formed by a workman and onto a platform or runway on which is placed the other half of the flask to assemble the same. When the two parts of the flask are assembled on the runway, they are then moved along the same ready for the succeeding flask. The invention, broadly considered, includes a suitable platform on which the molds that compose the flask are formed by the workman. Located above the platform is a track and mounted on the track is a frame-work or truck which is supported by rollers that travel on the track. This frame-work has pivotally mounted therein a rotatable mold receiving frame which is provided with means for automatically attaching a molding flask, either the cope or nowel, thereto. The mold receiving frame is formed with devices for readily releasing the flask after the same has been transferred from the platform where the workman forms the molds and onto the flask assembling platform.

Suitable means are provided for moving the mold upward into the mold receiving frame, and additional means are provided for conveying the mold in the frame into a position that is directly over the platform or runway where the flask is assembled. Means are also provided for automatically placing the mold receiving frame is an inclined position if desired when it reaches the flask assembling position over the platform or runway.

Referring to the drawings:

Figure 1 is a side elevational view showing the overhead trackway which supports the frame-work or carriage, also the means for moving the carriage on the track, a runway or platform is shown at the right on which the molds are placed in assembling or forming the flask, the dotted line positions show the carriage in the act of being moved or traveling from a position over the platform on which the molds are formed to the assembling runway or platform, and also showing the mold receiving frame during the operation of being rotated through 180°. The right hand portion of the figure illustrates the lowering of the mold on to the bottom board or other member of the flask.

Fig. 2 is an end elevational view of Fig. 1 showing the supporting rails of the track on which the truck is located that supports the frame in which the rotatable mold receiving frame is mounted and the mold receiving frame at its lower end and in a horizontal position, also illustrating the cylinder and piston construction for raising and lowering the slidable frame which supports the mold receiving frame. This view of the crane shows the main frame in a vertical position and the mold receiving frame in a horizontal position.

Fig. 3 is a view partly in section similar to Fig. 2, but showing the main frame in its tipped or inclined position and prior to placing the mold on the bottom board or flask as shown in dotted lines at the right of Fig. 1. This inclined position corresponds with the angle of inclination of the bottom board on the runway and on which the flask is placed in assembling.

Fig. 4 is a detail sectional view of one corner of the mold receiving frame showing the handle and the mechanism operated thereby for releasing the mold from the receiving frame; also the rack and pinion for automatically withdrawing the four locking pins which retain the mold in place in the mold receiving frame.

Fig. 5 is a sectional view on the line 5—5 of Fig. 4 showing the springs and the two armed lever for retaining the locking pins in their locking positions, and Fig. 6 shows one of the locking pins in its locking position at one corner of the mold, either cope or nowel.

Referring to the drawings in detail: The overhead rails are indicated by the numerals 1 and 2, which are preferably channel shaped. Mounted on these rails is a truck indicated as a whole by the numeral 3, having supporting wheels 4. Depending from the frame work of the truck 3 is a main frame work 5, formed of end plates 6, 7 and 8, and side plates and braces 6', 7' and 8'. Located inside of the main frame work 5 is a second frame work 10 which is vertically slidable therein. This frame work is connected to a piston 11, mounted in a cylinder 12, which cylinder is supported above the main frame work 5 by means of the channel irons 13. The piston 11 is connected to the piston rod 14 which in turn is connected at its lower end to the slidable frame 10.

Suitable means are provided for furnishing a supply of compressed air to the cylinder 12, whereby the piston 11 is raised and lowered carrying with it the slidable frame 10. Located at the lower end of the slidable frame 10 is a frame 15 which is pivotally mounted in the sides 16 and 17 of the slidable frame 10, by means of the pintles 18. The frame 15 is for receiving the frames in which the molds are formed by the workman. 19 designates a handle for rotating the frame 15 on its pintles 18. 19' is a locking device on the handle 19 for locking the frame 15 to the frame 10 by means of the pin entering the recess $19^2$ in the part $19^3$. The main frame 5 is pivotally connected to the depending pieces 20 of the truck 3, as indicated at 21. 22 is a plate oppositely located to the pintle 21 and is provided with a supporting roller 23 which travels on the track 24 that is secured to the inner side of the channel bar 1. This track, as shown, in dotted lines in Fig. 1 is formed with an inclined portion 24' and a second horizontal portion $24^2$. The plate 22 carries a bracket 25, having the opening 26 to receive a block 26' which is secured to a rod 27 which is secured to the brackets 27' on the frame 5. This opening 27' on the frame 5 permits the block to move in the opening 26 of the bracket 25 and allows the main frame 5 to assume the inclined position shown in Fig. 3 when the roller 23 passes down the incline 24' on to the horizontal portion $24^2$.

Referring to Fig. 1, 28 indicates a suitable platform on which the workman forms the molds, the cope and nowel, which go to make up the flask. This platform is provided with a flat smooth plate 29 on which the pattern is placed by the workman, as indicated by the line from the numeral 30. The mold, either cope or nowel, is indicated at 31 and is formed at its four corners with the metal plates 32 having the inclined edges 33 and the recess or opening 34. Located below the pattern receiving platform 29 is a cylinder 35 having suitable connections with a supply of compressed air indicated by the pipe line 36. Located in the cylinder 35 is the piston 37 to which the piston rod 38 is connected. This piston rod is attached to the plate 39 having pins 40 extending upward therefrom. These pins pass through openings 41 in the plate 29 and engage the lower edges of the molding frame 31, whereby when the piston 37 rises, the mold 31 containing the impression of the pattern 30 in the molding sand is elevated. This molding frame and its mold is pushed upward as shown by the dotted line position in Fig. 1, and into the rotatable frame 15 which, as already described, is pivotally located in the slidable frame 10. As the frame 31 with the molded sand 31' therein is pushed into the rotatable frame 15, the inclined plates 32 engage the locking pins 42 as shown in Fig. 6. These locking pins are normally drawn inward into the position shown in Fig. 6 by means of the two springs 43. One end of these springs is attached to the frame 15 at the point 44 and their opposite ends to pins 45. These pins are connected to the pin 42, which in turn slides on the shaft 46. The pin 42 at its outer end is formed into a plate 42' having an elongated opening $42^2$ and inclined shoulders $42^3$. 47 designates a handle that is attached to the shaft 46 whereby when the handle is operated the locking pins 42 are withdrawn from the recesses 34 in the plates 32 of the mold receiving frame 15 as the arms 46' on shaft 46 engage the shoulders $42^3$. In order to simultaneously operate the four locking pins 42, the ends of the shaft 46 are provided with a pinion 48 which engages a rack 49. This rack operates the pins on the corresponding shaft on the opposite side of the frame 15.

In operation the workman places the pattern 30 on the flat plate 29, then the molding frame 31, then fills this frame with the molding sand 31'. Next the piston 37 rises and the pins 40 engage the lower edge of the frame 31 and carries the same into locking engagement with the rotatable mold receiving frame 15 leaving the pattern 30 in place on the plate 29 ready for repeating the next operation. The workman now operates the carriage 3, by any suitable means, as by compressed air, (3' indicates a piston rod for this purpose) which in turn moves the main frame 5 into the dotted line position 5' in Fig. 1. The operator now rotates the mold receiving frame 15 if necessary by means of the handle 19 to bring the mold 31, either cope or nowel, into correct position to form the flask. In order to bring the mold 31 into its correct or matching position, over a second mold, which has already been placed on the bottom board 50 on the runway 52, shown at the right of Fig. 1, the truck 3 with the frames 5 and 10 are moved along the tracks 1 and 2. When the mold 31 in the rotatable frame 15 is over the mold 31 on the bottom board 50, the slidable frame 10 is lowered carrying the mold 31 downward as indicated by the arrow 51. This downward operation is accomplished by the piston 11 shown in Fig. 3. When the frame 31 reaches the platform or bottom board 50, the operator moves the handle 47 and releases the molding frame 31. This frame may be either the nowel or the cope, according to which side the mold is when it reaches the runway 52. It is to be understood that the molder is making the molds from the same pattern all the time. When the frame 31 has been deposited the carriage 3 and frames 5 and 10 are then returned to their original positions over platform 28 and the same operation is repeated.

It will, therefore, be seen that in forming, matching and assembling the molds to make the flask ready for pouring, it is only necessary to employ two workmen for operating the apparatus, one for forming the molds on the platform 29 and the second workman for releasing and placing the molding fames 31 on the bottom board 50. Any suitable means may be employed for moving the truck 3 backward and forward as air pressure, or ropes suitably connected thereto.

What I claim is:

1. In an apparatus for conveying molds from the molding position to the assembling position at which is located a mold receiving platform and comprising a track for supporting the apparatus, a truck, a main frame supported thereby, a supplemental frame mounted in said frame and designed for movements therein, a rotatable mold receiving frame supported on the movable frame, said rotatable frame having means for automatically receiving and locking a molding frame therein, whereby when the frames are moved along the track, the mold may be conveyed to the assembling position or platform, as described.

2. An apparatus of the kind described, comprising in combination, a frame, a frame slidably mounted thereon, means for moving the frames as a unit, a mold frame receiving member rotatably supported in the sliding frame, means for conveying all of said frames as a unit to the assembling position, and for returning the same to their original or mold forming position.

3. In a mold assembling crane, the combination, a truck means for movably supporting the same, a main frame supported by the truck, a frame slidable in said frame, a mold receiving frame rotatably supported in the slidable frame, and means for permitting the main and slidable frame to assume an inclined position for the purpose described, when the truck is moved into a position for assembling the molds.

4. A mold receiving frame having, in combination, oppositely located shafts, rack and pinions for operating the same, locking pins operable from said shafts for engaging a molding frame having recesses therein for receiving the pins.

CLARENCE K. PRINCE.